United States Patent
Okubo (10) Patent No.: US 10,942,327 B2
(45) Date of Patent: Mar. 9, 2021

(54) CENTERING MECHANISM, LENS UNIT, PROJECTION SYSTEM, AND PROJECTOR

(71) Applicant: SEIKO EPSON CORPORATION, Tokyo (JP)

(72) Inventor: Hirofumi Okubo, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 183 days.

(21) Appl. No.: 16/360,299

(22) Filed: Mar. 21, 2019

(65) Prior Publication Data

US 2019/0293897 A1    Sep. 26, 2019

(30) Foreign Application Priority Data

Mar. 22, 2018  (JP) .............. JP2018-053978

(51) Int. Cl.
*G02B 7/02*     (2006.01)
*G03B 21/14*    (2006.01)
*G02B 7/00*     (2021.01)
*G02B 7/04*     (2021.01)

(52) U.S. Cl.
CPC ............. *G02B 7/003* (2013.01); *G02B 7/04* (2013.01); *G03B 21/142* (2013.01)

(58) Field of Classification Search
CPC .......... G02B 7/023; G02B 7/003; G02B 7/04; G03B 21/142
See application file for complete search history.

(56) References Cited

U.S. PATENT DOCUMENTS

2004/0109243 A1\* 6/2004 Orimo ............... G03F 7/70825
359/819

FOREIGN PATENT DOCUMENTS

JP    2002-014267 A    1/2002

\* cited by examiner

*Primary Examiner* — Ryan D Howard
(74) *Attorney, Agent, or Firm* — Dority & Manning, P.A.

(57) ABSTRACT

A centering pin pushes an inclining surface provided as part of a side section of a lens frame that accommodates a centering target lens that is a centering target lens group to allow the centering target lens to move in a centering direction. In this process, an end surface of the lens frame is always urged against a reference surface that positions the lens frame attached to an attachment section of a lens barrel in the optical axis direction.

20 Claims, 10 Drawing Sheets

CENTERING MECHANISM, LENS UNIT, PROJECTION SYSTEM, AND PROJECTOR

BACKGROUND

1. Technical Field

The present invention relates to a centering mechanism that centers a lens, a lens unit including the centering mechanism, a projection system including the lens unit, and a projector including the projection system.

2. Related Art

As a centering mechanism provided in a lens unit, there is, for example, a known centering mechanism that centers a fixed lens group disposed on the side closest to the object side (see JP-A-2002-14267, for example).

The centering mechanism described in JP-A-2002-14267, however, includes, for example, three sets of adjusting screws and fixing screws, adjusts any inclination of the fixed lens group with respect to the optical axis with the aid of the adjusting screws, and then fixes the fixed lens group with the fixing screws. The centering mechanism has a large number of parts and requires the adjustment of the adjusting screws multiple times and fixation of the other screws.

SUMMARY

A centering mechanism according to an aspect of the invention includes a lens frame that has a side portion having an inclining surface and accommodates a centering target lens group and a centering pin that comes into contact with the inclining surface of the lens frame, urges the lens frame against a reference surface, and is capable of moving the lens frame in a direction that intersects an optical axis of the lens.

In the centering mechanism described above, the centering pin is caused to comes into contact with the inclining surface provided as part of the side section of the lens frame, which accommodates the centering target lens group, to allow the lens frame and in turn the centering target lens group to move in the direction that intersects the optical axis of the lens. In this process, the lens frame is urged against the reference surface to prevent the centering target lens group from inclining, whereby reliable, high-precision centering can be performed even in a simple configuration that requires no separate part for preventing the centering target lens group from inclining.

A lens unit according to another aspect of the invention includes the centering mechanism described above and an attachment section having the reference surface. In this case, the lens unit including the centering mechanism described above allows high-precision centering to be readily and reliably performed, whereby a high-performance lens unit can be provided.

A projection system according to another aspect of the invention includes the lens unit described above. In this case, the lens unit including the centering mechanism described above allows high-precision centering to be readily and reliably performed, whereby a high-performance projection system can be provided.

A projector according to another aspect of the invention includes a light modulation device that modulates light a light source to form an image and the projection system described above that projects the image from the light modulation device. In this case, the projection system including the centering mechanism described above allows high-precision centering to be readily and reliably performed, whereby a high-performance projector can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
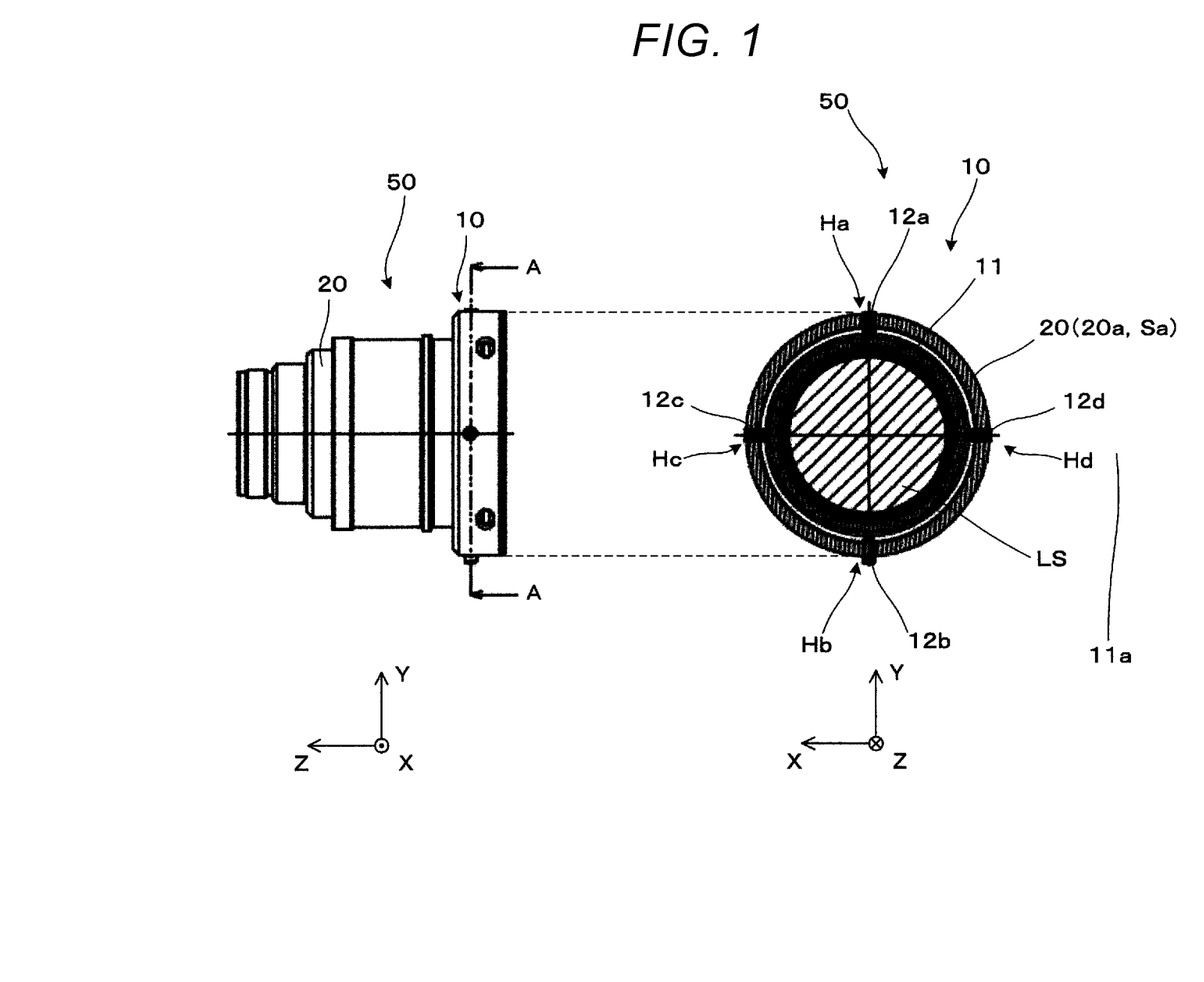
FIG. 1 is a side view and a cross-sectional view showing an example of the configuration of a lens unit that incorporates a centering mechanism according to a first embodiment.
Figure 2:
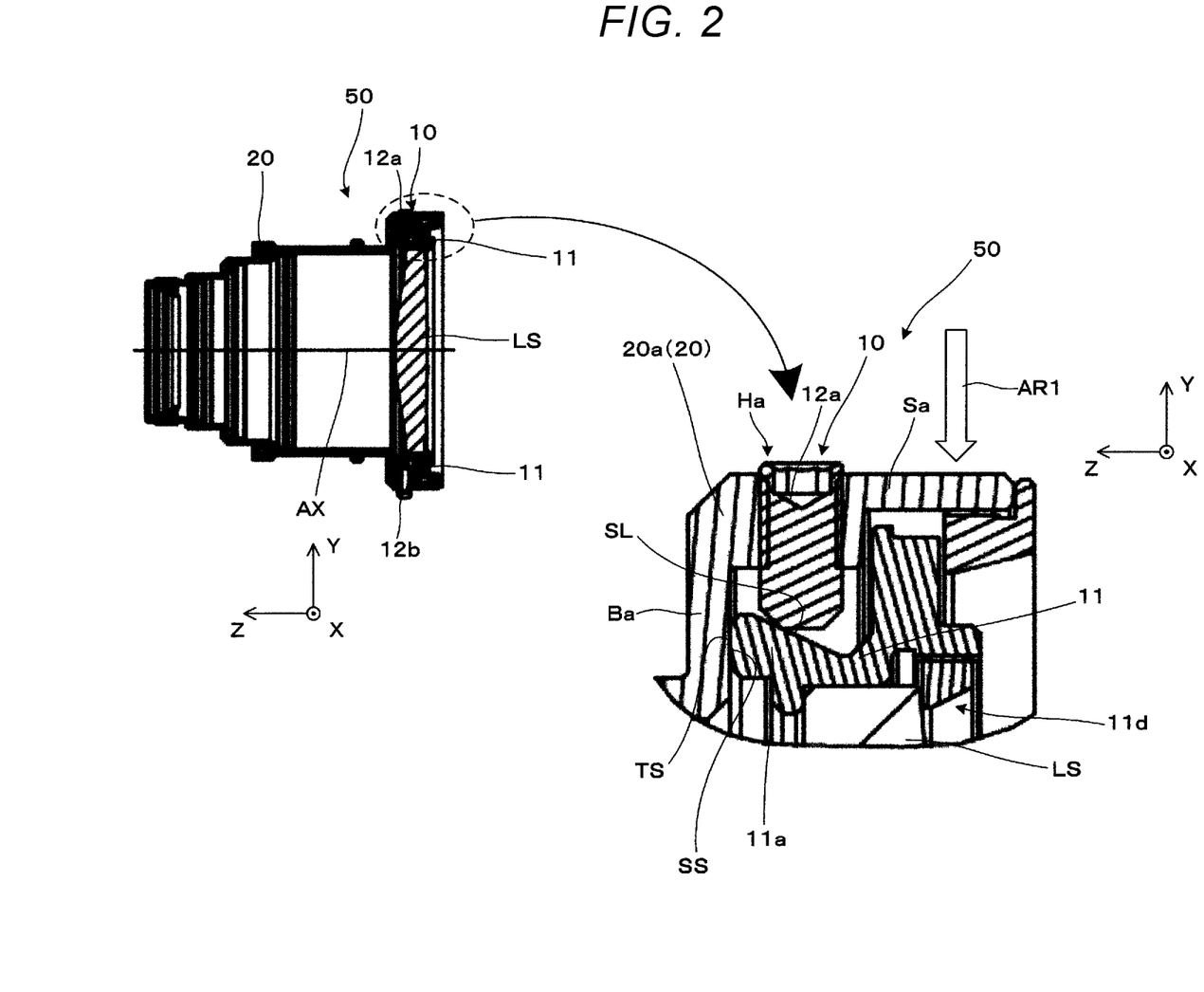
FIG. 2 is a side cross-sectional view and a partially enlarged view of the lens unit that incorporates the centering mechanism.
Figure 3:
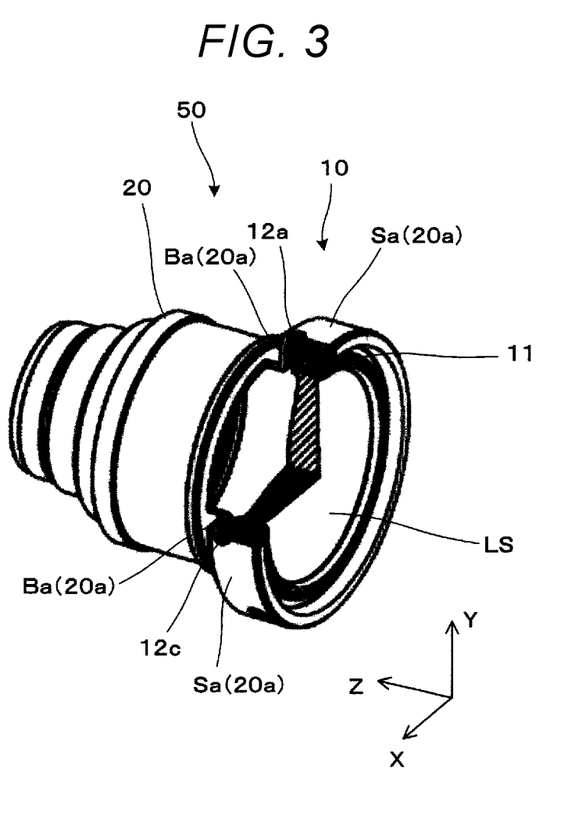
FIG. 3 is a perspective view of the lens unit that incorporates the centering mechanism with part of the lens unit cut off.
Figure 4A:
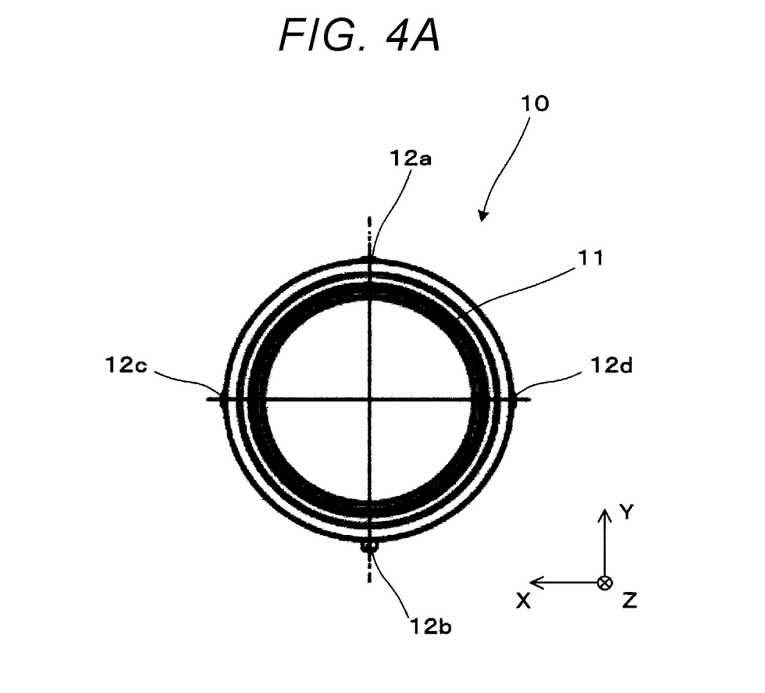
FIG. 4A is a front view of the centering mechanism.
Figure 4B:
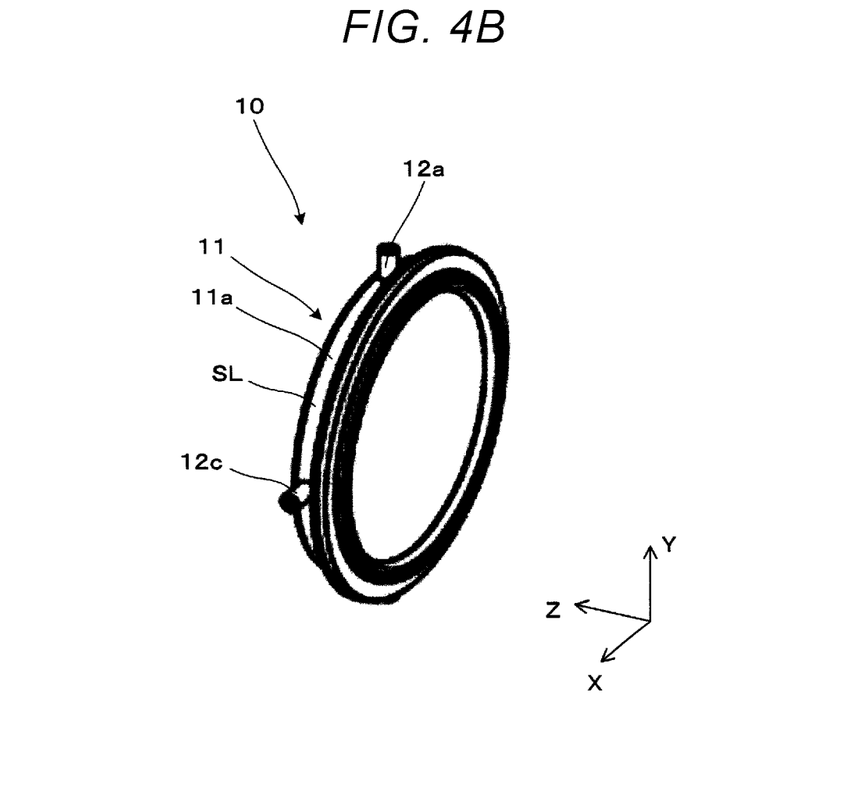
FIG. 4B is a perspective view of the centering mechanism.

An example of a centering mechanism and a lens unit that incorporates the centering mechanism according to a first embodiment will be described below with reference to FIG. 1 and other figures. FIG. 1 is a side view and a cross-sectional view showing an example of the configuration of a lens unit 50, which incorporates a centering mechanism 10 according to the present embodiment. That is, the cross-sectional view shown in the right portion of FIG. 1 is the cross-sectional view taken along the line A-A in the side view shown in the left portion of FIG. 1. FIG. 2 is a side cross-sectional view corresponding to the side view of FIG. 1 and a partially enlarged view of the side cross-sectional view, and FIG. 3 is a perspective view with part of the lens unit 50 cut off, the cut-off part including the centering mechanism 10. Further, FIGS. 4A and 4B are a front view and a perspective view of the centering mechanism 10 in the lens unit 50, respectively.

The lens unit 50 according to the present embodiment includes the centering mechanism 10 and a lens barrel 20 as well as one or more lenses, as shown in FIG. 1 and other figures. In the example shown in FIG. 2 and other figures, the lens or lenses that form the lens unit 50 are not drawn for simplification of the description except a centering target lens LS, which forms a centering target lens group that is incorporated in the centering mechanism 10 and is a target of the centering. In FIG. 1 and other figures, the centering target lens group is drawn in the form of the single centering target lens LS for simplification of the description and may instead be formed of a plurality of lenses.

The lens unit 50 can be used as any of a variety of optical systems or part thereof, and the illustrated lens unit 50 not only is a moving lens group of the optical system that forms a projector but forms a focusing group. In the description, the direction along an optical axis AX of the lens is called a direction Z, and directions in a plane perpendicular to the direction Z are called directions X and Y. In the description, out of the in-plane directions described above with respect to the direction of the optical axis AX, the vertical direction, that is, the upward/downward direction is the direction Y, and the horizontal direction, that is, the rightward/leftward direction is the direction X, as shown in FIG. 1 and other figures.

In the lens unit 50, the centering mechanism 10 includes a lens frame 11, which is a frame structure that accommodates the centering target lens LS to be centered, and four centering pins 12a to 12d, which are a plurality of centering pins that are provided around the lens frame 11 and center the centering target lens LS.

Out of the components that form the centering mechanism 10, the lens frame 11 is a frame member that has an annular frame structure and accommodates the centering target lens LS, which has a circular shape, with the centering target lens LS fit into the frame structure, as shown, for example, in FIGS. 2, 4A, and 4B. To this end, the lens frame 11 includes a side section 11a, which is a main portion and forms the side of the lens frame 11, and a lens assembly section 11d, which extends inward from the inner wall of the side section 11a to allow the centering target lens LS to be fit.

The side section 11a is so tapered as to form an inclining surface SL, which inclines with respect to the optical axis AX, as shown, for example, in the partially enlarged view of FIG. 2. In other plainer words, the inclining surface SL of the lens frame 11 is tapered. The lens frame 11 has an end surface TS as a bottom surface portion of the side section 11a. The end surface TS is a portion in contact with a positioning portion of the lens barrel 20. The inclining surface SL forms a tapered surface so shaped as to taper with distance from the end surface TS, as shown in FIG. 2. In the present embodiment, the four centering pins 12a to 12d push the inclining surface SL to center the centering target lens LS.

The lens assembly section 11d includes, for example, claw-shaped portions extending inward from the inner wall of the side section 11a, and the centering target lens LS is fit into the lens assembly section 11d with the claw-shaped portions holding the centering target lens LS. The centering target lens LS is thus fixed to the lens frame 11.

The other component of the centering mechanism 10 or the plurality of centering pins 12a to 12d are each formed of a screw member or a plunger and push the lens frame 11 sideways to allow the centering target lens LS to move in the directions in the plane XY. In the description, the first centering pin 12a and the second centering pin 12b extend in the direction Y, that is, the vertical direction (upward/downward direction) and are so paired as to face each other, and the third centering pin 12c and the fourth centering pin 12d extend in the direction X, that is, the horizontal direction (rightward/leftward direction) and are so paired as to face each other. The centering pins 12a to 12d each come into contact with the inclining surface SL of the side section 11a, which is the main portion of the lens frame 11, and can push the lens frame 11 and in turn the centering target lens LS via the inclining surface SL along the direction in which the centering pin 12 extends. For example, the first centering pin 12a is formed of a screw member, such as a worm screw having a hexagonal hole in a head portion thereof. When the first centering pin 12a is so screwed as to advance, the first centering pin 12a can push the inclining surface SL in the direction −Y indicated by the arrow AR1, as shown in the partially enlarged view of FIG. 2 byway of example. Similarly, the second centering pin 12b can push the inclining surface SL in the direction +Y, the third centering pin 12c can push the inclining surface SL in the direction −X, and the fourth centering pin 12d can push the inclining surface SL in the direction +X. The thus configured centering pins 12a to 12d allow the centering target lens LS to be centered in the directions in the plane XY perpendicular to the direction of the optical axis AX, that is, the direction Z. As described above, the directions in the plane XY are directions in which the centering target lens LS is centered in the description.

In the lens unit 50, the lens barrel 20 is a cylindrical member and is so shaped as to have inner steps, as shown, for example, in FIG. 2, whereby the lens barrel 20 can position and fix a single lens or multiple lenses in a specified position or specified positions. In particular, in the example shown in FIG. 2, the centering mechanism 10 is located on the furthest side in the direction of the optical axis AX, that is, the direction Z in the lens barrel 20. To this end, an attachment section 20a is provided in a −Z-side end portion of the lens barrel 20.

The attachment section 20a is formed of a side surface section Sa, which is provided along the circumference of the lens frame 11, and a bottom surface section Ba, which extends along a plane XY perpendicular to the optical axis. In the cross-sectional view of FIG. 2 and a partially enlarged view of FIG. 2, for example, the side surface section Sa and the bottom surface section Ba form an L-letter-shaped cross section.

Out of the components that form the attachment section 20a, the side surface section Sa is provided with holes Ha to Hd in correspondence with the centering pins 12a to 12d, as shown, for example, in the cross-sectional view of FIG. 1. That is, the centering pin 12a passes through the corresponding hole Ha and is in contact with the inclining surface SL of the lens frame 11, as shown in FIG. 2 by way of example. In other words, the head portions of the centering pins 12a to 12d are exposed out of the holes Ha to Hd, and the centering pins 12a to 12d attached to the attachment section 20a are adjustable.

On the other hand, the other component of the attachment section 20a or the bottom surface section Ba is a flat surface parallel to the plane XY and forms a reference surface SS, which serves as a positioning/fixing surface with which the end surface TS is in contact. That is, the bottom surface section Ba, which allows the end surface TS, which forms the +Z-side end of the lens frame 11, to be in contact with the reference surface SS, positions the lens frame in the direction of the optical axis AX and prevents the lens surface from inclining with respect to the optical axis AX, that is, prevents the centering target lens LS from inclining with respect to the optical axis AX.

In the present embodiment, the configuration described above allows the end surface TS of the lens frame 11 to be in contact with the reference surface SS of the attachment section 20a and therefore allows the end surface TS to be parallel to the plane XY, whereby any inclination of the lens surface of the centering target lens LS with respect to the optical axis AX is suppressed. Further, the plurality of centering pins 12a to 12d can center the lens frame 11 in the directions in the plane XY perpendicular to the direction Z, which is the direction of the optical axis AX.

In the centering operation described above performed by the centering mechanism 10, to perform the centering, that is, adjust the lens position by moving the lens in the directions parallel to the plane XY, it is important to maintain the state of no inclination of the lens with respect to the optical axis AX. That is, it is important to maintain the state in which the end surface TS of the lens frame 11 is in contact with the reference surface SS so that no positional shift in the direction of the optical axis AX or no inclination with respect to the optical axis AX occurs. In the present embodiment, the configuration described above allows the centering pins 12a to 12d to come into contact with the inclining surface SL of the lens frame 11 to urge the lens frame 11 toward the reference surface SS and move the lens frame 11 in the directions that intersect the optical axis AX of the lens. That is, the centering pins 12a to 12d push the portions where the centering pins 12a to 12d are in contact with the inclining surface SL of the lens frame 11 to move the lens frame 11 in the centering directions with the end surface TS of the lens frame 11 always urged against the reference surface SS. No inclination described above will therefore occur without use of any separate part required.

Figure 5A:
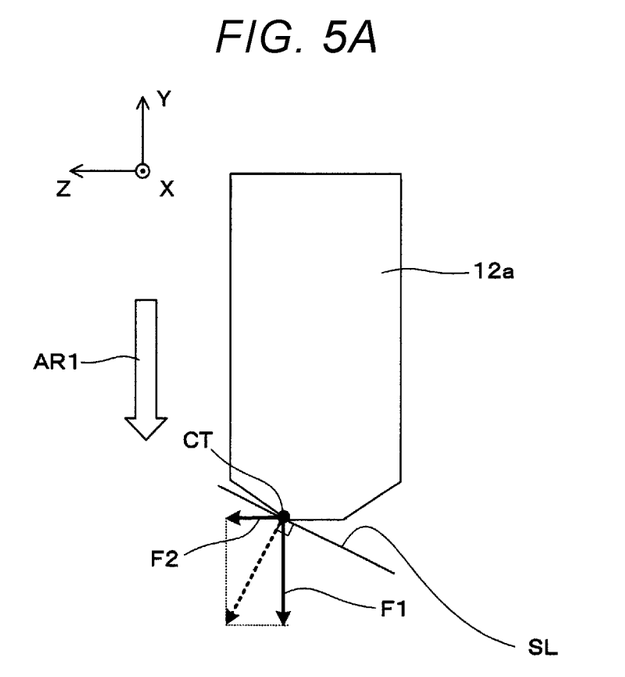
FIG. 5A is a conceptual view for describing centering operation performed by a centering pin.
Figure 5B:
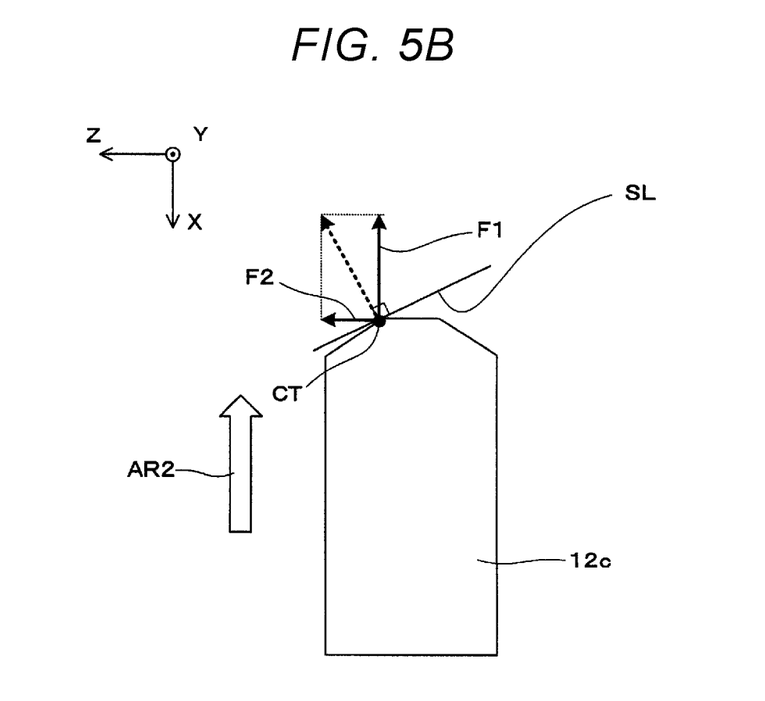
FIG. 5B is a conceptual view for describing centering operation performed by another centering pin.

The centering operation performed by the centering pins 12a to 12d will be described below with reference to conceptual views shown in FIGS. 5A and 5B. FIGS. 5A and 5B show the first centering pin 12a and the third centering pin 12c, respectively, shown in FIG. 3, which is a partially cut off view.

How the first centering pin 12a pushes the inclining surface SL will first be described with reference to FIG. 5A. In this case, the first centering pin 12a acts on the inclining surface SL in the direction −Y indicated by the arrow AR1, as described above. In this process, let CT be the contact point where the front end of the first centering pin 12a comes into contact with the inclining surface SL, and force F1 acts in the direction −Y on the inclining surface SL and force F2 acts in the direction +Z on the inclining surface SL at the contact point CT, as shown, for example, in FIG. 5A, because the inclining surface SL is a tapered surface that tapers along the direction −Z. That is, the lens frame 11 is pushed not only in the direction −Y but in the direction +Z. Therefore, in the lens frame 11 shown in FIG. 2 and other figures, the end surface TS moves in the direction −Y, which is one of the centering directions, with the end surface TS always urged against the reference surface SS, which is located on the side +Z.

How the third centering pin 12c pushes the inclining surface SL will next be described with reference to FIG. 5B. In this case, the third centering pin 12c acts on the inclining surface SL in the direction −X indicated by the arrow AR2. In this process, force F1 acts in the direction −X on the inclining surface SL and force F2 acts in the direction +Z on the inclining surface SL at the contact point CT, as in the case described above. That is, the lens frame 11 is pushed not only in the direction −X but in the direction +Z. The end surface TS therefore moves in the direction −X, which is the other centering direction, with the end surface TS always urged against the reference surface SS, which is located on the side +Z.

Although not illustrated or described below, the second centering pin 12b and the fourth centering pin 12d can similarly move the lens frame 11 in the centering directions with the end surface TS urged against the reference surface SS. In other words, the centering pins 12a to 12d, which are moved in the centering directions, each urge the lens frame 11 in the direction Z, which is the direction of the optical axis AX.

It can also be said from a different point of view that the inclining surface SL of the lens frame 11 so inclines as to direct the force received from each of the centering pins 12a to 12d toward the reference surface SS.

As described above, in the centering mechanism 10 and the lens unit 50 including the centering mechanism 10 according to the present embodiment, the centering pins 12a to 12d push the inclining surface SL provided as part of the side section 11a of the lens frame 11, which accommodates the centering target lens LS, which is the centering target lens group, to allow the lens frame 11 and in turn the centering target lens LS to move in the centering directions. In this process, the end surface TS of the lens frame 11 is always urged against the reference surface SS, which positions the lens frame 11, which is attached to the attachment section 20a of the lens barrel 20, in the optical axis direction. As a result, reliable, high-precision centering can be performed in a simple configuration that requires no separate part for preventing the centering target lens LS from inclining.

Further, in the above description, the plurality of centering pins are formed of the four centering pins 12a to 12d, the first and second centering pins 12a, 12b, which are so paired as to face each other in the vertical direction (upward/downward direction), and the third and fourth centering pins 12c, 12d, which are so paired as to face each other in the horizontal direction (rightward/leftward direction), to allow the centering target lens LS to be centered by the operation of pushing the side surface of the lens frame 11 in at least two different directions. However, the aspect described above is not necessarily employed, and a variety of other aspects that allow centering in the directions in the plane XY can be employed. Further, the above description has been made of the case where the centering pins 12a to 12d are each a screw member, and it is conceivable that part or entirety of the centering pins 12a to 12d is formed, for example, of a plunger having a spring structure. For example, it is conceivable to employ a structure in which the first centering pin 12a and the second centering pin 12b, which are disposed as a pair, are so configured that the first centering pin 12a is formed of a worm screw, as described above, whereas the second centering pin 12b is formed of a plunger to allow the lens frame 11 to move back and forth in the direction in which the first centering pin 12a is screwed, that is, in the directions ±Y depending on the direction in which the first centering pin 12a is rotated and further allow the second centering pin 12b along with the first centering pin 12a to push the lens frame 11 back in the direction +Y for centering the centering target lens LS in the direction Y. A plurality of centering pins including at least two centering pins movable in different directions allow desired centering of the centering target lens LS.

Second Embodiment

Figure 6:
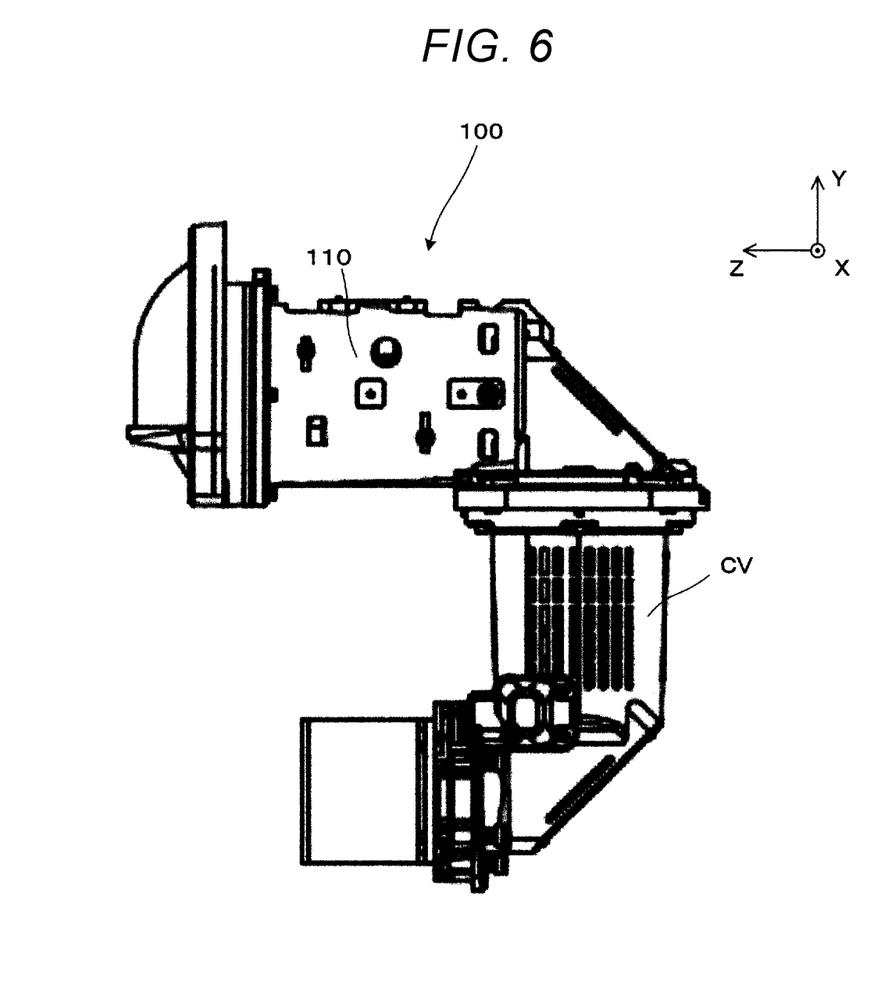
FIG. 6 is a side view showing an example of the configuration of a projection system according to a second embodiment.
Figure 7:
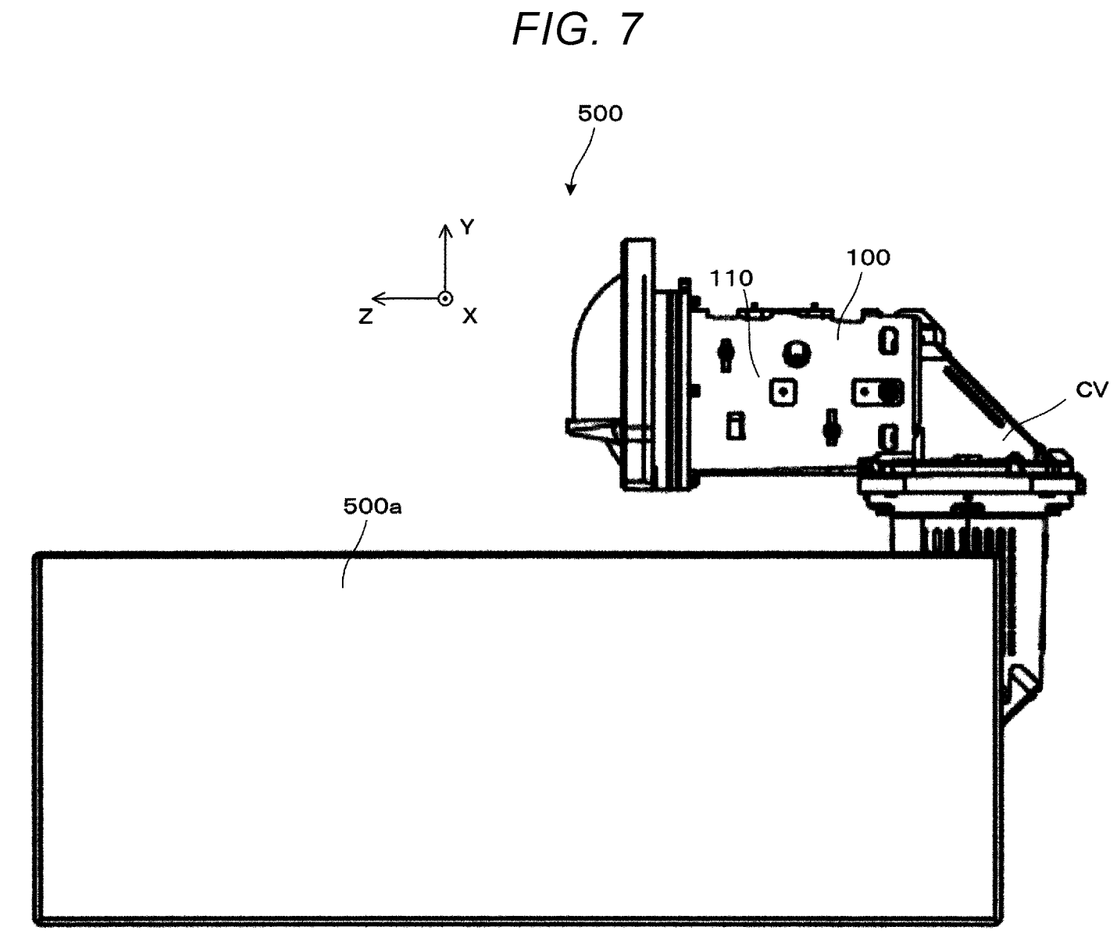
FIG. 7 is a side view conceptually showing an example of the configuration of a projector that incorporates the projection system in FIG. 6.
Figure 8:
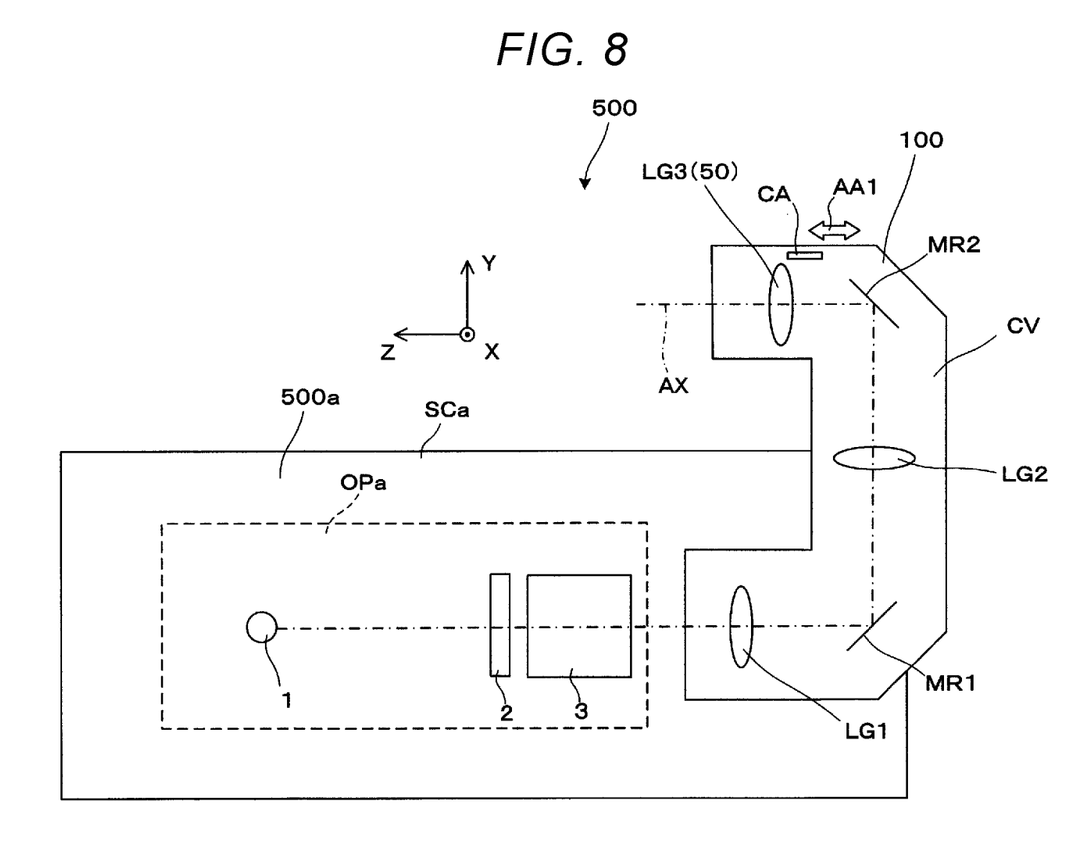
FIG. 8 is a conceptual view for describing an overview of the structure of the projector.
Figure 9A:
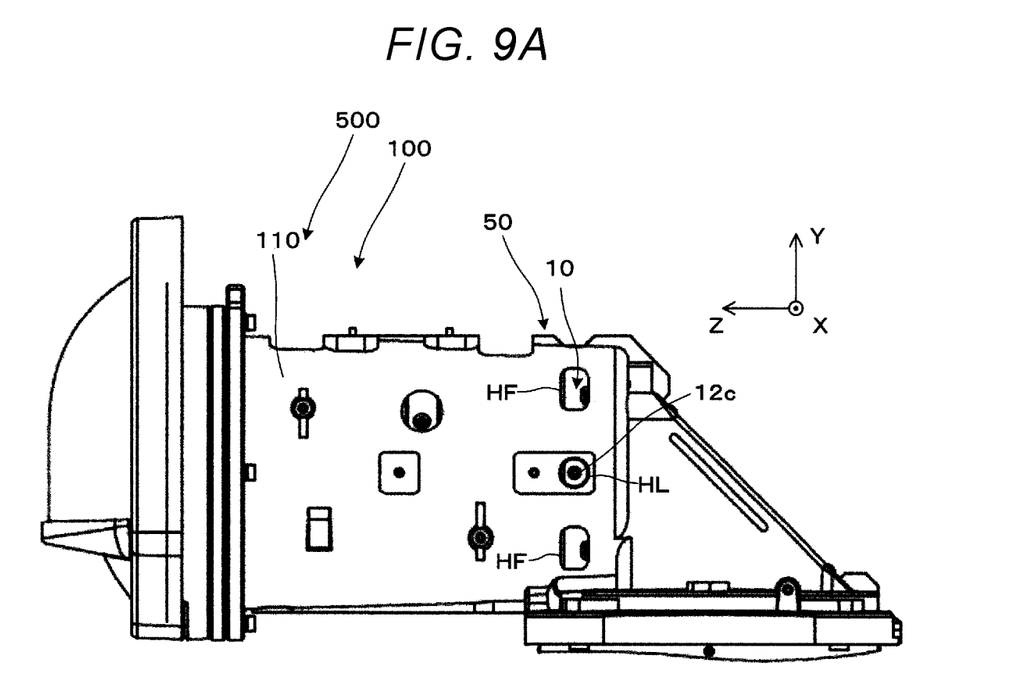
FIG. 9A is a partially enlarged view of the projection system shown in FIG. 6.
Figure 9B:
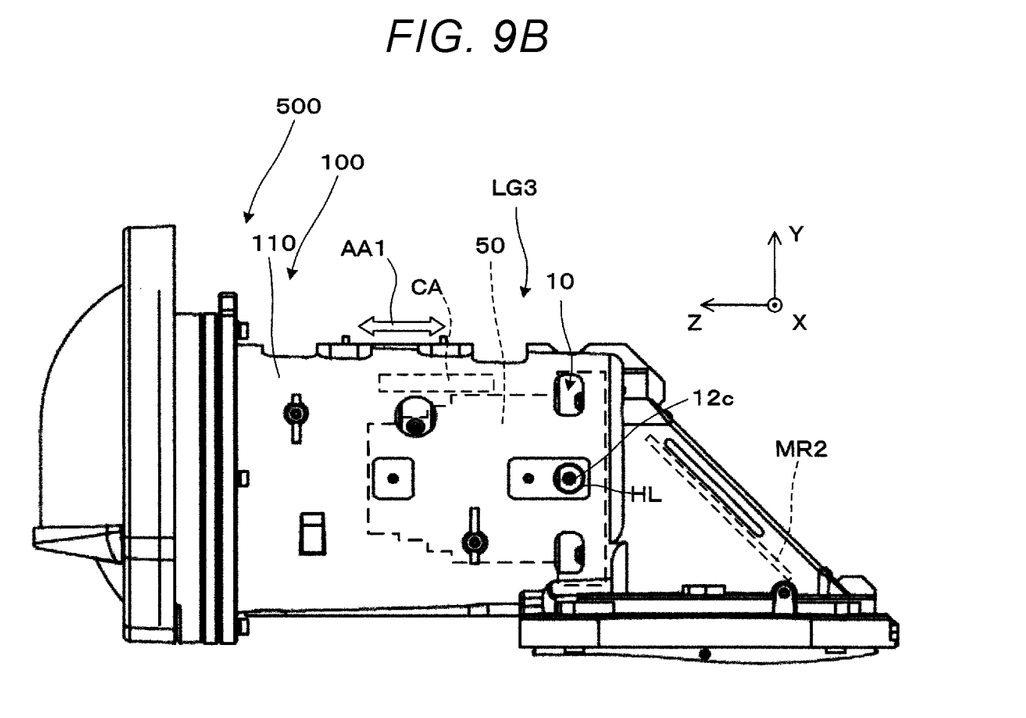
FIG. 9B is a partially enlarged view showing the arrangement of the lens unit incorporated in the projection system.
Figure 10:
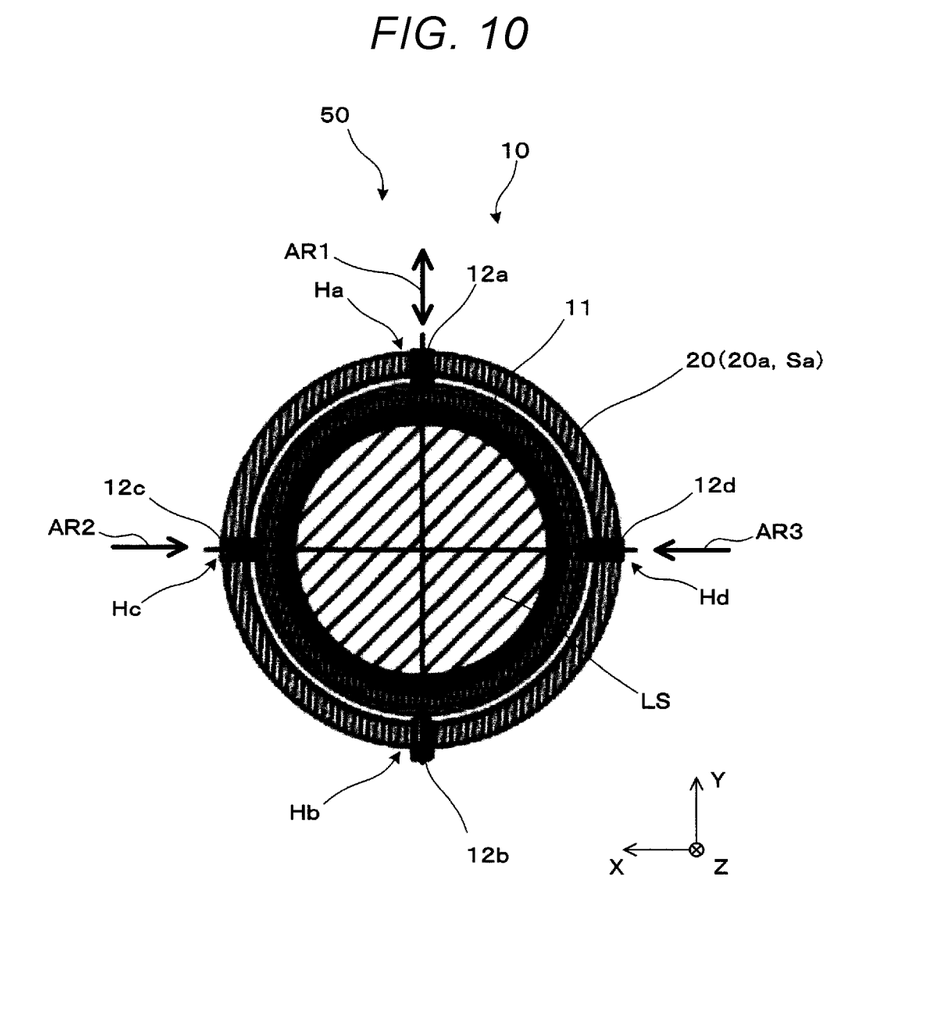
FIG. 10 is a cross-sectional view for describing how the centering mechanism incorporated in the projector performs adjustment.

An example of a projection system and a projector that incorporates the projection system according to a second embodiment will be described below with reference to FIGS. 6 to 10. FIG. 6 is a side view showing an example of the configuration of a projection system 100 according to the present embodiment, and FIG. 7 is a side view conceptually showing an example of the configuration of a projector 500 that incorporates the projection system 100 in FIG. 6. FIG. 8 is a conceptual view for describing an overview of the structure of the projector 500 including the projection system 100. FIG. 9A is a partially enlarged view of the projection system 100 shown in FIG. 6 and other figures and shows a magnifying-side portion of the projection system 100. FIG. 9B shows the arrangement of the lens unit 50 incorporated in the projection system 100 in FIG. 9A with the broken line showing the lens unit 50. That is, in the present embodiment, the lens unit 50 including the centering mechanism 10 forms a magnifying-side optical system of the projection system 100. Further, FIG. 10 shows the centering mechanism 10 for describing an example of how the centering mechanism 10 in the lens unit 50 incorporated in the projector 500 performs the adjustment. In the present embodiment, the lens unit 50 incorporated in the projector 500 or the projection system 100 and the centering mechanism 10 incorporated in the lens unit 50 are the same as those in the first embodiment, and portions having the same functions therefore have the same reference characters and will not be described or otherwise illustrated in detail.

An overview of the projection system 100 and the projector 500 incorporating the projection system 100 according to the present embodiment will be described below with reference to FIGS. 6 to 8.

The projection system 100 according to the present embodiment is formed of an optical system having a U-letter-shaped optical path, as shown, for example, in FIG. 6. The projector 500 has a configuration in which the U-letter-shaped projection system 100 is attached to a main section 500a, as shown in FIG. 7. That is, the projector 500, in which the projection system 100 deflects the direction of light outputted from the main section 500a sequentially in two steps, enlarges an image and projects the enlarged image toward a projection surface disposed on the side opposite the side toward which the light outputted from the main section 500a travels.

An overview of the configurations and actions of the projection system 100 and the projector 500 will be described below with reference to FIG. 8. First, the projector 500 includes the main section 500a and the projection system 100, as described above.

The main section 500a of the projector 500 is a portion that forms an image to be projected and includes an optical unit OPa as a primary portion that performs the image formation. It is assumed that the optical unit OPa is formed, for example, of a light source 1, a color separation system (not shown), light modulators 2, which are each a light modulation device that modulates the light from the light source 1 to form an image, and a cross dichroic prism 3. The light source 1, the color separation system, the light modulators 2, and the cross dichroic prism 3 are accommodated in an enclosure Sca, and the entire structure forms the main section 500a.

The light source 1 emits an amount of light large enough for image projection, for example, laser light, and can be a discharge type light source or a solid-state light source, such as a light emitting diode and a laser. The color separation system, which is not shown, separates the light emitted from the light source 1 into light fluxes having three colors, red light, green light, and blue light. Further, the light modulators 2 are formed, for example, of transmissive liquid crystal panels provided for the color light fluxes separated by the color separation system and modulate the incident color light fluxes in accordance with image information. Finally, the cross dichroic prism 3 combines the color light fluxes modulated by the light modulators 2 with one another and outputs the combined light as image light toward the projection system 100.

The light modulators 2 are not necessarily formed of transmissive liquid crystal panels and can instead be formed of reflective liquid crystal panels or micromirror-type devices, for example, DMD-based devices.

The projection system 100 includes a first optical system LG1, a first mirror MR1, a second optical system LG2, a second mirror MR2, and a third optical system LG3 arranged from the demagnifying side and projects images from the light modulators 2, that is, a combined image from the optical unit OPa. The projection system 100 further includes a cover member CV, which covers the optical elements of the projection system 100.

The first optical system LG1 outputs the light having exited out of the optical unit OPa in the direction −Z in the form, for example, of an intermediate image toward the first mirror MR1. The first mirror MR1 deflects the light from the first optical system LG1 in the direction +Y to cause the light to travel toward the second optical system LG2. The second optical system LG2, for example, enlarges the intermediate image formed by the first optical system LG1 and outputs the enlarged intermediate image toward the second mirror MR2. The second mirror MR2 deflects the light from the second optical system LG2 in the direction +Z to cause the light to travel toward the third optical system LG3. The third optical system LG3, which is located in a position closest to the magnifying side, performs focus adjustment and image plane adjustment and then performs image projection.

In the projector 500, which uses the deflection-type projection system 100 described above and hence has a large size, lens adjustment in the final stage is particularly very important. In the adjustment after the projection system 100 is assembled, however, it can be very difficult to perform adjustment at the location where the projection system 100 is in contact with or in the vicinity of the main section of the projector, such as the first optical system. LG1 and the second optical system LG2.

To this end, in the present embodiment, the third optical system LG3, which is separate from the main section of the projector and exposed therefrom, performs the focus adjustment and the image plane adjustment, which are important in the final-stage adjustment. In addition to the above, the lens unit 50 incorporating the centering mechanism 10 described in the first embodiment by way of example is provided as the third optical system LG3 or part thereof, as shown in FIGS. 8, 9A, and 9B and other figures. That is, the lens unit 50 is provided on the magnifying side of the deflection optical system, which is formed of the first and second mirrors MR1, MR2, which deflect the optical path, out of the projection system 100, which is a U-letter-shaped deflection-type optical system, that is, on the downstream side of the deflection optical system in the optical path to allow the deflection-type optical system to adjust the third optical system LG3.

It is assumed, for example, in the description that the lens unit 50 is, as the optical system that forms the projection system 100 of the projector 500, a focusing group that moves when the focusing is performed, that is, a moving lens group that moves in the direction of the optical axis AX when the focus adjustment is performed. Further, the projection system 100 includes a cam mechanism CA, which moves the lens unit 50 as the moving lens group in the optical axis direction but does not rotate the lens unit 50 around the optical axis AX. That is, the lens unit 50 travels straight with no rotation. In this case, since the centering mechanism 10 attached to the lens unit 50 is fixed to the lens unit 50 in the direction of the optical axis AX, the centering mechanism 10 moves straight as part of the lens unit 50 in the direction of the optical axis AX integrally with the other portions of the lens unit 50.

Further, in the projection system 100, a lens barrel 110, which is part of the cover member CV and so disposed on the magnifying side that the lens unit 50 is attached to the lens barrel 110, is provided with holes HL for centering in correspondence with the centering pins of the centering mechanism 10, as shown in FIGS. 9A and 9B. The holes HL for centering each extend in the direction of the optical axis AX. For example, the hole HL for centering shown in FIGS. 9A and 9B by way of example is provided in correspondence with the third centering pin 12c out of the centering pins of the centering mechanism 10. The heat portion of the third centering pin 12c is therefore still exposed in the state shown in FIG. 9A and other figures, and the third centering pin 12c therefore allows the lens centering adjustment, that is, is movable in the directions in the plane XY. In a specific description, first of all, the configuration described above allows the lens unit 50 as the moving lens group to move but prevents the centering mechanism 10 from rotating with the aid of the cam mechanism CA, as described above. Further, the holes HL for centering each extend in the direction in which the lens unit 50 moves. Therefore, even after the lens unit 50 moves for focusing, the third centering pin 12c of the centering mechanism 10 is exposed through the hole HL for centering, whereby the state in which the third centering pin 12c is adjustable is maintained. That is, after the lens unit 50 moves for the focus adjustment, the centering can be performed by using the centering mechanism 10. From a different point of view, the centering mechanism 10 is provided in a position where the centering mechanism 10 is exposed out of the main section 500a and allows the centering in the state in which the projection system 100 is attached to the main section 500a of the projector 500.

The lens barrel 110 is further provided with a hole HF for fixation. After the centering is performed by using the centering mechanism 10, the centering mechanism 10 and the lens unit 50 including the centering mechanism 10 can be fixed with an adhesive by injecting the adhesive through the hole HF for fixation.

The configuration of the centering mechanism 10 and how the centering mechanism 10 performs the adjustment in the state in which the centering mechanism 10 is incorporated in the projector 500 as described above will be described below with reference to FIG. 10. FIG. 10 is a cross-sectional view corresponding to the cross-sectional view of FIG. 2. It is assumed in the description that the centering mechanism 10 is formed of the four centering pins 12a to 12d disposed in the upper, lower, right, and left portions of the centering mechanism 10 as shown in FIG. 10, as in the case shown in FIG. 2. It is, however, noted that out of the four centering pins 12a to 12d, only the second centering pin 12b, which faces the inner side of the U-letter-shaped projection system 100, has a spring structure using a plunger or any other component so that the second centering pin 12b along with the first centering pin 12a, which faces the second centering pin 12b, pushes the lens frame 11 back in the direction +Y, and that the other centering pins 12a, 12c, and 12d each have a screw structure and can be pushed forward in the directions indicated by the arrows AR1 to AR3, respectively, in a screw driving manner. The operability of the centering mechanism 10 can thus be improved in the final-stage lens adjustment in the deflection-type projection system 100. That is, in the adjustment in the upward/downward direction (direction Y), the first centering pin 12a is moved upward/downward, and in the adjustment in the rightward/leftward direction (direction X), the third and fourth centering pins 12c, 12d are moved rightward/leftward to perform the adjustment in the directions in the plane XY.

As described above, the projection system 100 and the projector 500 including the projection system 100 according to the present embodiment, which each include the centering mechanism 10, allow reliable, high-precision centering in a simple configuration that requires no separate part for preventing the centering target lens LS from inclining.

Particularly, in the present embodiment, the lens adjustment using the centering mechanism 10 in the projection system 100 can be performed in the final-stage adjustment of the projector 500.

As described above, in a specific aspect of the invention, the centering pins urge the lens frame in the direction of the optical axis of the lens. In this case, the urged centering target lens does not shift in the optical axis direction or incline with respect therewith, whereby reliable, high-precision centering can be performed even in the simple configuration that requires no separate part. Further, since the centering target lens does not need to be fixed with a screw after the centering, positional shift of the centering target lens that may occur when fixed can be avoided.

In another aspect of the invention, the centering pins include at least two centering pins movable in different directions. In this case, for example, the centering target is movable in the directions in a plane perpendicular to the optical axis.

In still another aspect of the invention, the inclining surface of the lens frame is tapered. A desired inclining surface can therefore be, for example, readily and reliably formed at the side portion of the lens frame.

In still another aspect of the invention, the lens unit is a moving lens group in the projection system. In this case, a lens provided in the moving lens group can be centered.

Instill another aspect of the invention, the moving lens group is a focusing group that moves when focusing is performed. In this case, a lens provided in the focusing group can be centered.

In still another aspect of the invention, the projection system includes a deflection-type optical system having a deflected optical path, and the lens unit is provided on the magnifying side of the deflection-type optical system. In this case, the centering can be performed on the magnifying side of the deflection-type optical system.

In still another aspect of the invention, the projection system includes the cam mechanism that moves the lens unit in the optical axis direction but does not rotate the lens unit around the optical axis. In this case, the state in which the centering mechanism does not rotate can be achieved in the movement of the lens unit.

In still another aspect of the invention, the lens barrel, to which the lens unit is attached, has the holes for centering that are provided in correspondence with the centering pins and extend in the optical axis direction. In this case, the moving lens unit can be centered by adjusting the centering pins through the holes for centering.

In still another aspect of the invention, in the projector, the centering mechanism is provided in a position where the centering mechanism is exposed out of the main section and allows the centering to be performed in the state in which the projection system is attached to the main section. In this case, the centering using the centering mechanism can be performed with the projection system attached to the main section.

Others

The invention has been described above with reference to the embodiments. The invention is, however, not limited to the embodiments described above and can be implemented in a variety of aspects to the extent that the aspects do not depart from the substance of the invention.

First, in each of the embodiments described above, the centering mechanism can be provided in a variety of positions in accordance with the application in which the lens unit, the projection system, and other configurations are used. That is, the centering mechanism according to each of the embodiments of the invention can be used in a variety of optical systems in addition to a moving group and a focusing group.

In the formation of the inclining surface of the side section of the lens frame, the inclining surface is not necessarily entirely tapered. For example, only the portion where the centering pins come into contact with the inclining surface may instead be an inclining surface. Further, the inclining surface is not necessarily tapered and may instead be a flat inclining surface.

The deflection-type projection system does not necessarily have a U-letter shape, and the invention is applicable to projection systems having an L-letter shape and a variety of other shapes. The invention is also applicable to a non-deflection, linear projection system.

The entire disclosure of Japanese Patent Application No. 2018-053978, filed on Mar. 22, 2018 is expressly incorporated by reference herein.

What is claimed is:

1. A centering mechanism comprising:
   a lens frame that has a side portion having an inclining surface and accommodates a centering target lens group; and
   a centering pin that comes into contact with the inclining surface of the lens frame, urges the lens frame against a reference surface, and is capable of moving the lens frame in a direction that intersects an optical axis of the lens.

2. The centering mechanism according to claim 1, wherein the centering pin urges the lens frame in a direction of the optical axis of the lens.

3. The centering mechanism according to claim 1, wherein the centering pin is formed of at least two centering pins movable in different directions.

4. The centering mechanism according to claim 1, wherein the inclining surface of the lens frame is tapered.

5. A lens unit comprising:
   the centering mechanism according to claim 1; and
   an attachment section having the reference surface.

6. A lens unit comprising:
   the centering mechanism according to claim 2; and
   an attachment section having the reference surface.

7. A lens unit comprising:
   the centering mechanism according to claim 3; and
   an attachment section having the reference surface.

8. A projection system comprising the lens unit according to claim 5.

9. A projection system comprising the lens unit according to claim 6.

10. A projection system comprising the lens unit according to claim 7.

11. The projection system according to claim 8, wherein the lens unit is a moving lens group.

12. The projection system according to claim 11, wherein the moving lens group is a focusing group that moves when focusing is performed.

13. The projection system according to claim 11,
    further comprising a deflection-type optical system having a deflected optical path,
    wherein the lens unit is provided on a magnifying side of the deflection-type optical system.

14. The projection system according to claim 11, further comprising a cam mechanism that moves the lens unit in a direction of an optical axis but does not rotate the lens unit around the optical axis.

15. The projection system according to claim 14, wherein a lens barrel to which the lens unit is attached has a hole for centering that is provided in correspondence with the centering pin and extends in the direction of the optical axis.

16. A projector comprising:
    a light modulation device that modulates light from a light source to form an image; and
    the projection system according to claim 11 that projects the image from the light modulation device.

17. A projector comprising:
    a light modulation device that modulates light from a light source to form an image; and
    the projection system according to claim 12 that projects the image from the light modulation device.

18. A projector comprising:
    a light modulation device that modulates light from a light source to form an image; and
    the projection system according to claim 13 that projects the image from the light modulation device.

19. A projector comprising:
    a light modulation device that modulates light from a light source to form an image; and
    the projection system according to claim 14 that projects the image from the light modulation device.

20. The projector according to claim 16, wherein in a state in which the projection system is attached to a main section, the centering mechanism is provided in a position where the centering mechanism is exposed out of the main section and is capable of centering the lens.

* * * * *